Figure 4:
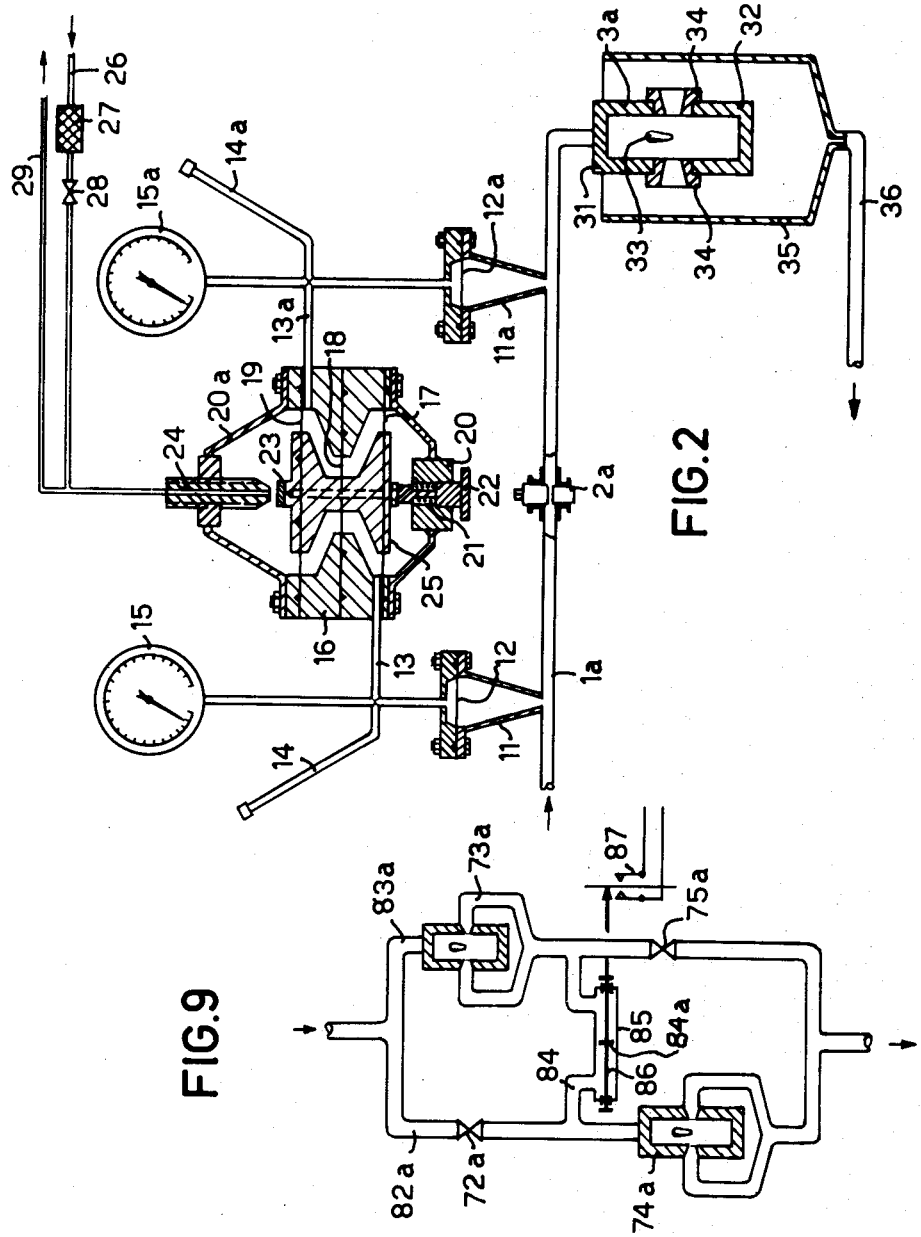

Aug. 30, 1955
F. J. FONTEIN
2,716,337
APPARATUS RESPONSIVE TO VARIATIONS IN
THE VISCOSITY OF A FLUID
Filed Oct. 7, 1952
4 Sheets-Sheet 1
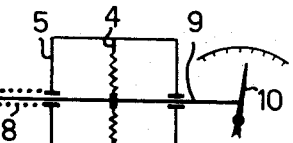
FIG.1
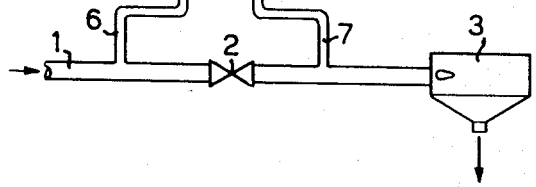
FIG.4
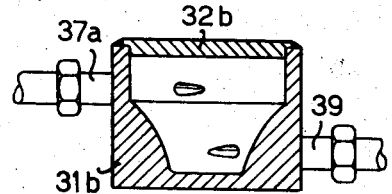
FIG.3
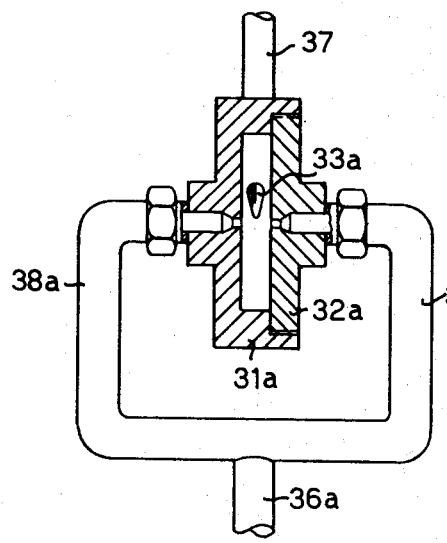
Inventor
Freerk J. Fontein
By Cushman, Darby & Cushman
Attorneys Aug. 30, 1955

F. J. FONTEIN 2,716,337

APPARATUS RESPONSIVE TO VARIATIONS IN
THE VISCOSITY OF A FLUID

Filed Oct. 7, 1952

4 Sheets-Sheet 4

Inventor
Freerk J. Fontein
By Cushman, Darby & Cushman
Attorneys

United States Patent Office
2,716,337
Patented Aug. 30, 1955

2,716,337

APPARATUS RESPONSIVE TO VARIATIONS IN THE VISCOSITY OF A FLUID

Freerk J. Fontein, Heerlen, Netherlands, assignor to Stamicarbon N. V., Heerlen, Netherlands Application October 7, 1952, Serial No. 313,567

Claims priority, application Netherlands October 9, 1951

6 Claims. (Cl. 73—54)

My invention relates to apparatus responsive to variations in the viscosity of a fluid. In particular the invention relates to apparatus responsive to variations in the viscosity of a fluid, in which said fluid can flow continuously.

The major object of my invention is to provide a new apparatus of the kind mentioned above in which a variation of the viscosity of a fluid fed to the apparatus actuates a displacement of an element, said displacement being used for actuating signalling, indicating, regulating or other devices.

It is also an object of the invention to provide a new apparatus responsive to variations in the viscosity of a fluid fed to the apparatus, in which a variation of the viscosity of this fluid generates a variation in a pressure, said pressure actuating an element responsive to pressure differences.

Another object of the invention is to provide a new apparatus of this sort in which the variation in the viscosity is measured as a variation in the amount of flow, this variation actuating a flow responsive element.

A further object of the invention is to provide new apparatus for signalling, indicating or regulating purposes, said apparatus being actuated by an element responsive to variations of the viscosity of a fluid.

Still another object of my invention is to provide a new method to measure the viscosity of a fluid.

It is also an object of my invention to provide a new method of regulating the viscosity of a fluid.

Further objects of the invention will appear from the examples which are described hereinafter.

These and other objects are attained by making use of the fact that the dependency of the coefficient of resistance of a flow resistor on the Reynolds number, i. e., on the viscosity of a flowing fluid, varies with the type of flow concerned. For instance: for a laminar flow through a conduit the coefficient of resistance is directly proportional to the viscosity; if there is a turbulent flow the coefficient of resistance may even decrease if the viscosity is increased.

If now in a flow pipe of low resistance there are arranged in series two flow resistors, whose coefficients of resistance at the applied velocities of the fluid vary differently according to the viscosity of the passing fluid, the pressure drop over each of these resistors will depend on the viscosity of the passing fluid, provided the total pressure drop over the two resistors is kept substantially constant.

If, for instance, the coefficient of resistance of the first resistor rises more rapidly with the viscosity than the second, the pressure drop over the first resistor will rise with the viscosity, whereas the pressure drop over the second resistor will fall.

The pressure drop variation over one of the resistors may be utilised to create an impulse for actuating a signalling, indicating, regulating or other device. The part through which the impulse is transmitted may be a pressure-sensitive diaphragm or diaphragms, the deflection of which under the influence of pressure drop may create a mechanical, pneumatic, hydraulic or electrical impulse by which such a device can be actuated.

If in a flow pipe of low resistance two flow resistors, having different characteristics with respect to the viscosity, are arranged in parallel and the pressure drop over these two resistors is kept constant, the proportion between the amounts of fluid flowing simultaneously through the two resistors will depend on the viscosity. By utilising, for instance, the difference between the rates of flow through the two resistors, for instance by means of a flowmeter, in which the forces generated by the flow act oppositely on the aforesaid part, again an impulse may be obtained, suitable for actuating a signalling, indicating, regulating or other device.

Very sensitive apparatus may be obtained by bifurcating the flow pipe and subsequently rejoining the branches and providing each branch with the like combination of two flow resistors, but arranged in such a manner that in the one branch the order of the two resistors is opposed to that in the other.

The variation in the pressure difference between points in the two branches that are situated between the two respective couples of resistors is now considerably higher than the variation in the pressure drop over one resistor in the above mentioned case. If those points in the two branches are connected by means of a pipe or chamber, the liquid therein will be capable of moving in either direction or of remaining still, depending on the viscosity of the fluid. Also by making use of this phenomenon a signalling, indicating, regulating or other device may be actuated.

It will be clear that for obtaining absolute values it is necessary that the apparatus be gauged. The actual range of values may be extended by making the flow aperture of one or of both flow resistors adjustable or by making the pressure drop over the flow pipe variable.

To the foregoing ends the present invention provides an apparatus responsive to variations in the viscosity of a fluid and suitable for actuating a signalling, indicating, regulating or other device, and comprising (a) a flow pipe provided with at least two flow resistors the resistances of which, when the fluid is forced under pressure through the pipe, vary differently with variations in the viscosity of the fluid and (b) a part, movements of which are dependent on the changing magnitudes of the said resistances in relation to one another when the pressure drop over each of the resistors (when they are in parallel) or the total pressure drop over the resistors (when they are in series) is kept substantially constant.

The invention also comprises a process of causing the movement of a part in response to variations in the viscosity of a fluid, which consists in forcing fluid at substantially constant pressure through a flow pipe provided with at least two flow resistors the resistances of which vary differently according to the viscosity of the fluid passing through the pipe and, whilst maintaining the pressure drop over each of the resistors (when they are in parallel) or the total pressure drop over the resistors (when they are in series) substantially constant, utilising the changing magnitudes of the said resistances in relation to one another to cause movements of said part.

In a preferred embodiment of the apparatus the flow resistors are constituted by a throttling valve or throttling cock, whose flow aperture is preferably adjustable, and a resistor comprising a chamber bounded by a continuous surface of revolution and provided with at least one feed passage debouching tangentially into said chamber and with at least one discharge aperture arranged so that when fluid is forced through the rotation chamber the rotating fluid is forced to leave the chamber on a radius of rotation smaller than the radius of the cylinder tangentially to which the feed passage is directed.

By this arrangement the fluid is set in rapid rotation, with the current moving spirally inwards towards the axis of the chamber and the angular velocity increasing as the radius of rotation of the current decreases, the chamber having the characteristic that its resistance to the fluid flow decreases with increase in viscosity of the flowing fluid and vice versa. By "rotation chamber" when used hereinafter and in the claims hereof we mean (unless otherwise qualified) such a chamber.

One suitable form of such a chamber (hereinafter referred to as type A) has one end generally more or less tapered and provided with a central discharge aperture in its apex, there being provided one or more tangentially directed feed pipes which open into the wider end.

Particularly suitable is a form of rotation chamber (hereinafter referred to as type B) which is symmetrical with respect to a plane perpendicular to the axis of rotation and having two centrally arranged circular discharging apertures (one in each opposite end) and one or more tangentially directed feed pipes or feed slots whose center lines lie in the said plane of symmetry.

Another form of rotation chamber which may be employed (hereinafter referred to as type C) has tangentially directed feed and discharge pipes whose center lines are in tangential relation to two actual or imaginary cylinders, respectively, both co-axial with the rotation chamber, in such a manner that the radius of the cylinder relating to the feed pipes is greater than the radius of the cylinder relating to the discharge pipes.

Apparatus according to the invention may be of simple and robust construction. It can be adapted for the passage of large as well as for comparatively small quantities of fluid and can be used for many processes.

As examples we may mention its application in coal and ore washeries for regulating the viscosity and thereby the specific gravity of the washing suspension, or for actuating a regulating device for physical or chemical processes in which the viscosity of the final product varies considerably as a result of the process. Mention may be made of the extraction of viscous materials or of materials forming viscous solutions, the polymerisation of a monomer into a liquid product, the mixing of lubricating oils, etc.

The invention will now be further explained with the help of a number of embodiments illustrated in the accompanying drawings and given by way of example only. Fig. 1 is a diagrammatic representation of an installation of the apparatus according to my invention. Fig. 2 is a veiw similar to Fig. 1, but somewhat more detailed. Figs. 3 and 4 are schematic representations of possible rotation chambers used as resistors. Figs. 5, 6, 7, 8 and 9 give diagrammatic pictures of some further possible embodiments of the invention. In these embodiments a regulating valve and a rotation chamber resistor are used as flow resistors. It will be understood that also other types of flow resistors can be used.

In the drawings Figure 1 shows a flow pipe 1 in which a throttling valve 2 and a rotation chamber resistor 3 of type A are provided. If at a constant pressure a fluid is forced through the pipe, the difference in the pressures on either side of the valve 2 will depend on the viscosity. The pressure sensitive diaphragm 4, arranged in the box 5, is made responsive to this pressure difference. The pressures in the flow pipe are communicated to the two sides of the diaphragm through the connecting pipes 6 and 7. The deflection of the diaphragm operates a pointer 10, via a reciprocable element 9. The degree of deflection of the diaphragm may be adjusted by means of an opposing spring 8.

Figure 2 shows a more detailed view of a similar construction of the flow pipe. In the flow pipe 1a there is a throttling cock 2a, the area of whose orifice may be varied by opening it more or less, and the rotation chamber resistor 3a. This latter resistor is of the aforesaid type B. The rotation chamber 3a may consist of parts 31 and 32 which may be screwed together, e. g., as hereinafter described with reference to Figure 3. The flow pipe opens tangentially at 33 into the said chamber. The discharge apertures are formed by the nozzles 34, secured, e. g., screwed into the end walls of the rotation chamber 3a. The rotation chamber is surrounded by a vessel 35 with a discharge pipe 36.

As shown, three diaphragms 17, 18, 19 are indirectly connected to the flow pipe, the pressure being transmitted to the auxiliary liquid in the pipes 13 and 13a through the diverging pipes 11 and 11a and the diaphragms 12 and 12a, whereby the pressures on either side of the cock 2a are transmitted to the pressure-sensitive element 16, which contains the three diaphragms 17, 18 and 19, which are marginally clamped in the peripheral wall and centrally clamped in the floating member 25. The construction is thus such that when the pressure drop over the cock 2a is increased, the member 25 moves downwards against the force exerted by the spring 21, which can be adjusted by the set screw 22 working in the holder 20. The upper end of the member 25 is provided with a plate 23 by means of which the orifice of a nozzle 24 of a compressed air conduit can be shut off to a greater or lesser extent.

The compressed air is supplied through the pipe 26, via the air filter 27 and the throttling valve 28. Now a pressure is generated in the branch 29, which depends on the distance from the plate 23 to the orifice of the nozzle 24. By the variations in this pressure a signalling, indicating, regulating or other device may be actuated.

For supplying the auxiliary liquid, for which water may be used, filler pipes 14 and 14a are connected to the pipes 13 and 13a. The pressures before and behind the cock 2a can be read from the manometers 15 and 15a.

The aforesaid apparatus is particularly suited for indicating or regulating the viscosity of suspension, such as washing suspensions for coal and ore washeries.

Figure 3 represents a modified rotation chamber of the type B. The rotation chamber is constituted by two parts 31a and 32a, screwed together. Liquid is fed tangentially to the chamber through the pipe 37 and inlet 33a, the discharge taking place axially through the pipes 38 and 38a, which join into the discharge pipe 36a.

In Figure 4 the rotation chamber is of type C and is formed by the parts 31b and 32b. 37a is the feed pipe, the discharge taking place tangentially through the pipe 39.

It is necessary that the pressure drop over the flow pipe should be kept constant. In certain cases this may be promoted by providing, in the flow pipe, a preliminary regulating cock, or other regulating valve, e. g., a slide valve, which is controlled automatically.

Figure 5:
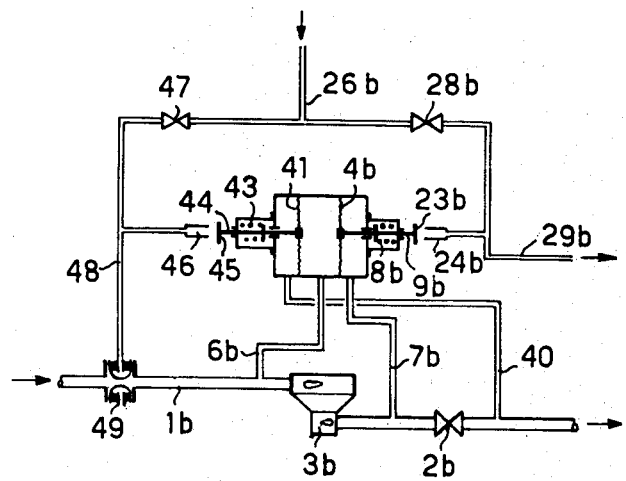

Figure 5 is a diagram of such a device.

A preliminary regulating valve 49 is provided in flow pipe 1b. Its flow aperture is formed by a hollow elastic-walled ring. By varying the pressure in the hollow wall of the ring its internal diameter can be varied. The flow pipe is provided with the regulating cock 2b and the rotation chamber resistor 3b being of type C.

Via the pipes 6b and 7b the difference in the pressure before and behind the resistor 3b is transmitted to the space on either side of the diaphragm 4b, with which cooperates the spring 8b. Via the rod 9b the movement of the diaphragm is transmitted to the plate 23b, which is capable of shutting off to a greater or lesser extent the aperture of the nozzle 24b of the compressed air conduit 26b, the pressure in which is reduced by the throttling cock 28b. In this way pressure variations are generated in the pipe 29b, by which variations a signalling, indicating, regulating or other device can be actuated.

Via the pipe 40 the pressure behind the throttling valve 2b is transmitted to one side of the diaphragm 41. As the other side of said diaphragm communicates, via the pipe 6b, with the flow pipe 1b before the resistors, the deflection of the diaphragm 41 is a measure of the total pressure drop over the flow resistors. Via a rod 44 around which the spring 43 co-operating with the diaphragm is provided, this deflection is transmitted to the plate 45, which is capable of shutting off to a greater or lesser extent the mouth of the nozzle 46 on the compressed air conduit 26b, the pressure in which is reduced by means of the throttling cock 47. In this way a regulating pressure is generated in the pipe 48, by which the valve 49 is controlled, thus regulating the pressure drop in the flow pipe.

Figure 6:
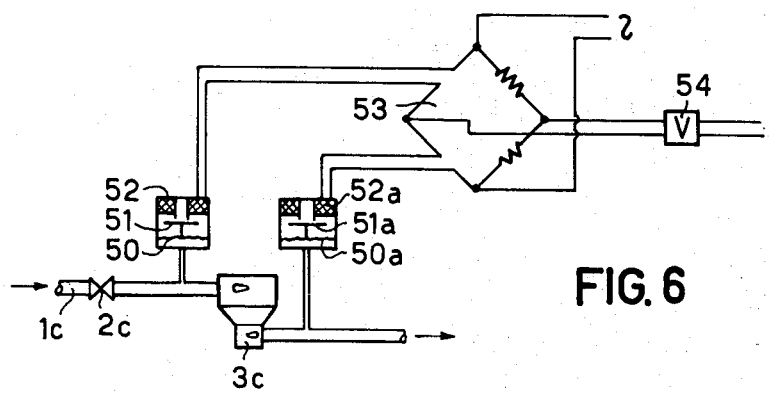

Figure 6 shows a construction including a flow pipe 1c in which a throttling valve 2c and a rotation chamber resistor 3c are provided, in which an actuating impulse is electrically derived from the pressure drop over the second resistor in the flow pipe. By the different pressures before and behind the resistor 3c the diaphragms 50 and 50a are displaced and movement transmitted to the soft iron plates 51 and 51a. In consequence the self-inductions of the coils 52 and 52a, in each of which a soft iron hollow core is provided, are varied. These self-inductions are compared in the Wheatstone bridge 53, which is excited by means of an alternating current. The electric impulse leaving the bridge is transformed by the amplifier 54 and can then be used as an actuating impulse.

Figure 7:
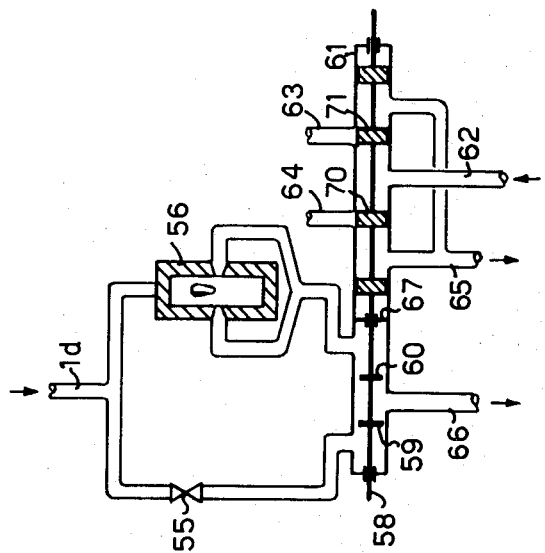

Figure 7 is a diagrammatic example of an apparatus in which the two flow resistors whose coefficients of resistance vary differently with varying viscosity are arranged in parallel, so that the pressure drops over those two resistors are equal while if they are kept constant the proportion of the quantities of fluid flowing simultaneously through the flow resistors is a measure of the viscosity of the fluid.

The flow pipe 1d is bifurcated, one of the branches being provided with a regulating valve 55, the other with a rotation chamber resistor 56 of type B. Via the regulating device these two branches join into a common discharge pipe 66.

A device responsive to the branch flows in the flow pipe consists of a cylinder 61 with a partition wall 67. Through an end wall and this wall 67 a piston rod 58 is reciprocatably mounted. On said piston rod 58 two disc-shaped members 59 and 60 are provided. The fluid, flowing through the flow resistors 55 and 56, exerts a force on the piston rod, causing it to move to the left or to the right, depending on the difference between the flow rates in the two branches. The second part of the cylinder contains a hydraulic relay, which, in itself, is known.

The hydraulic liquid is supplied via the pipe 62 and returned through the pipe 65. In dependence on the position of the piston rod, and hence of the pistons 70 and 71, a pressure difference or a current is generated in the pipes 63 and 64.

If the regulating cock 55 is adjusted so that at a certain viscosity $\nu$ the regulating device does not impart an impulse, a rise in the viscosity will cause the piston rod to move to the left, as a result of which the hydraulic liquid is forced into the pipe 64, while a connection is established between the pipe 63 and the discharge pipe. If the viscosity drops below the value $\nu$ the reverse will take place.

Figure 8:
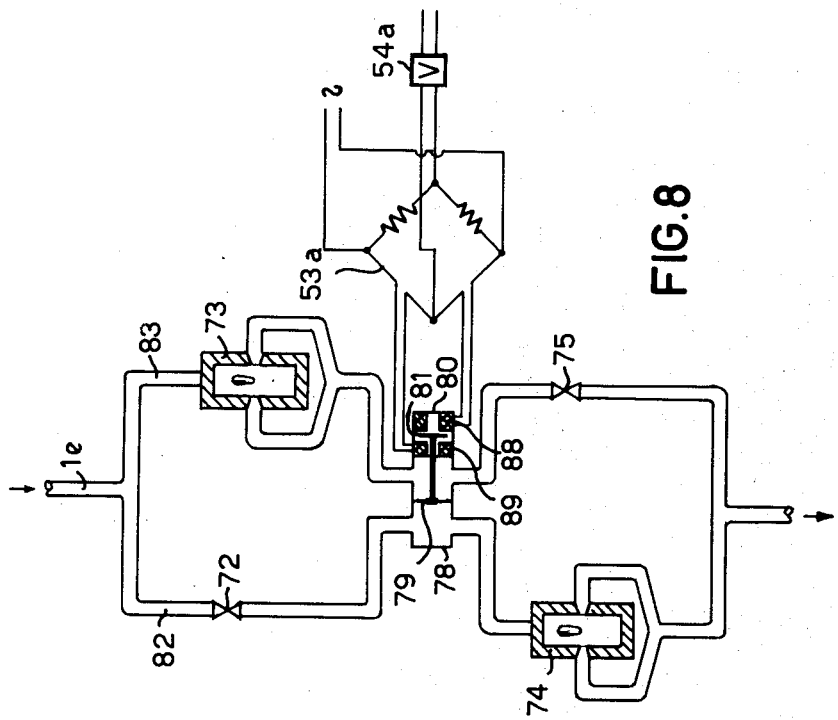

Figures 8 and 9 are diagrams of apparatus comprising four flow resistors.

The branches 82 and 83 of the flow pipe 1e comprise the throttling cocks 72 and 75 respectively and the rotation chamber resistors (type B) 73 and 74 respectively, but in reverse order. These flow resistors are so dimensioned that at a certain viscosity the pressures between the flow resistors in the two branches are about equal. By adjusting one of the throttling cocks 72 and 75 the pressures may be made exactly equal. If desired one of the throttling cocks 72 and 75 may be replaced by a fixed flow resistor. If the viscosity rises the pressure between the resistors in the branch 82 will fall by the mutual action of the resistors 72 and 74 whilst the pressure between the resistors in the branch 83 will rise as a result of the mutual action of the resistors 73 and 75. An increased effective difference in pressure is thus obtained by the duplex system. If the viscosity decreases the reverse will occur.

In the embodiment according to Figure 8 said pressure difference actuates a diaphragm 79. The displacement of said diaphragm is transmitted to a soft iron plate 81 which is reciprocable between two coils 88 and 89 provided in the soft iron block 80. In consequence the self-induction of these coils is altered, which alteration can be transformed into an actuating impulse via the Wheatstone bridge 53a and the amplifier 54a.

In the embodiment according to Figure 9 a pipe connection 84 is provided between the two branches 82a and 83a, in which pipe a flow meter 85 is inserted. As its current-sensitive element this flow meter comprises a reciprocable piston rod 86, on which a disc-shaped member 84a is provided.

In dependence on the direction of flow the switch 87 is operated, by means of which some device may be actuated.

From the foregoing detailed description of the details of apparatus embodying the invention it may be noted that the apparatus may take various forms. It should be understood, therefore, that details of the various embodiments are not intended to be limitative of the invention except in so far as set forth in the accompanying claims.

I claim:

1. Apparatus responsive to variations in viscosity of a fluid comprising a flow pipe for the fluid, a rotation chamber and a flow restrictor in said flow pipe, the resistance of said flow resistor and rotation chamber varying differently with variations in viscosity of the fluid, when fluid is forced under constant pressure through the flow pipe, differential pressure responsive apparatus connected to said flow pipe, at least one leg of said connection being connected to the flow pipe between said rotation chamber and said resistor, and said differential pressure responsive apparatus being responsive to relative changes in the resistance to flow of fluid through said rotation chamber and said resistor.

2. Apparatus according to claim 1, wherein said rotation chamber and flow restrictor are in series, and said differential pressure responsive apparatus is responsive to the pressure drop in the flow pipe across one of said series arranged elements.

3. Apparatus according to claim 1, wherein said rotation chamber and flow restrictor are in series with the flow restrictor upstream of the rotation chamber, and said differential pressure responsive apparatus is responsive to the pressure drop in the flow pipe across the flow restrictor.

4. Apparatus responsive to variations in the viscosity of a fluid comprising a flow pipe for the fluid, said flow pipe being divided into two branches, a rotation chamber in one of said branches and a throttling valve of adjustable aperture in the other of said branches, wherein the flow pipe branches open into a chamber having a common discharge, a reciprocable rod in said chamber and having spaced pistons thereon disposed on opposite sides of said discharge to be displaced in accordance with changes in velocity of flow from the branches, said rod extending through a wall of the chamber, and a member connected to and operated by said rod.

5. Apparatus responsive to variations in the viscosity of a fluid comprising a bifurcated flow pipe the branches being subsequently joined to continue the pipe, each branch having two flow resistors in series the resistances of which vary differently according to the viscosity of the fluid passing therethrough, the resistors in one branch being of like character but in reverse disposition with respect to those in the other branch so that between a region of one branch between its two resistors on the one hand and a region of the other branch between its two resistors on the other hand a difference in pressure will be created when the fluid is forced under pressure through the pipe and will vary with the fluid viscosity, and an element connected with said regions between the resistors in the two branches, said element having a movable part, being displaceable in response to the variation in the difference of pressure in said regions.

6. Apparatus according to claim 5, in which the two flow resistors in each branch are a rotation chamber and a throttling valve of adjustable aperture.

References Cited in the file of this patent

UNITED STATES PATENTS

| Number | Name | Date |
|---|---|---|
| 1,863,090 | Albersheim et al. | June 14, 1932 |
| 1,881,200 | Leask et al. | Oct. 4, 1932 |
| 1,963,011 | Albersheim et al. | June 12, 1934 |
| 2,010,837 | Albersheim et al. | Aug. 13, 1935 |
| 2,038,432 | Konheim et al. | Apr. 21, 1936 |
| 2,233,561 | Kalle | Mar. 4, 1941 |
| 2,352,835 | Hertel | July 4, 1944 |
| 2,378,491 | McNamee | June 19, 1945 |